Nov. 4, 1952 N. B. ORNITZ 2,616,549
APPARATUS FOR PROGRESSING ARTICLES OF MANUFACTURE
Original Filed June 5, 1946 5 Sheets-Sheet 1

INVENTOR
Nathaniel B. Ornitz
by his attorneys
Stebbins, Blenko & Webb

Nov. 4, 1952 N. B. ORNITZ 2,616,549
APPARATUS FOR PROGRESSING ARTICLES OF MANUFACTURE
Original Filed June 5, 1946 5 Sheets-Sheet 2
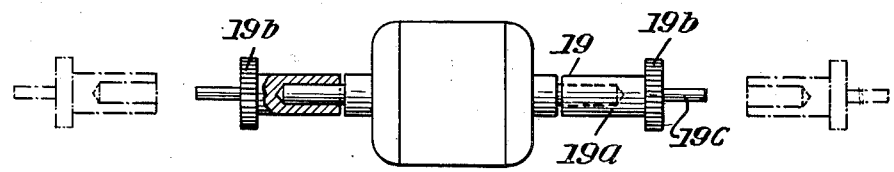
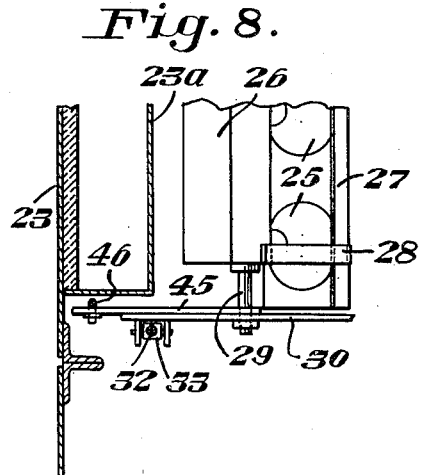
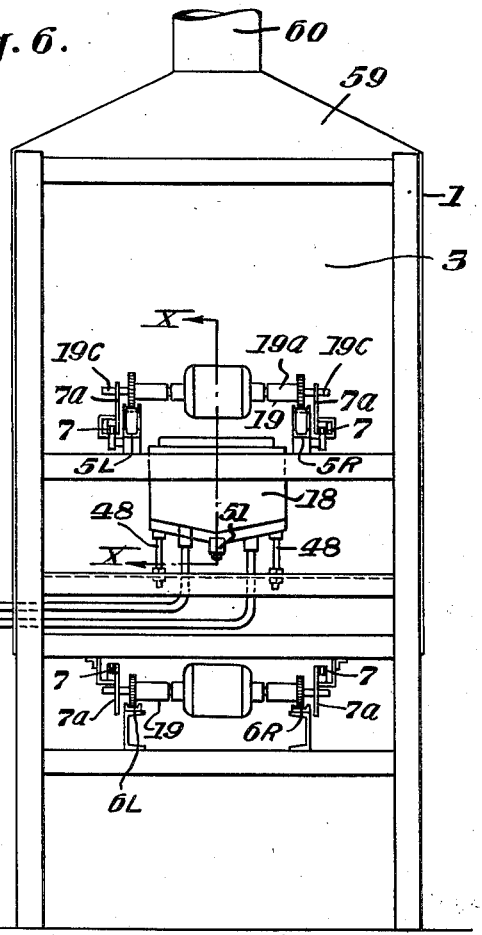
INVENTOR
Nathaniel B. Ornitz
by his attorneys
Stebbins, Blenko & Webb Nov. 4, 1952 — N. B. ORNITZ — 2,616,549
APPARATUS FOR PROGRESSING ARTICLES OF MANUFACTURE
Original Filed June 5, 1946 — 5 Sheets-Sheet 3
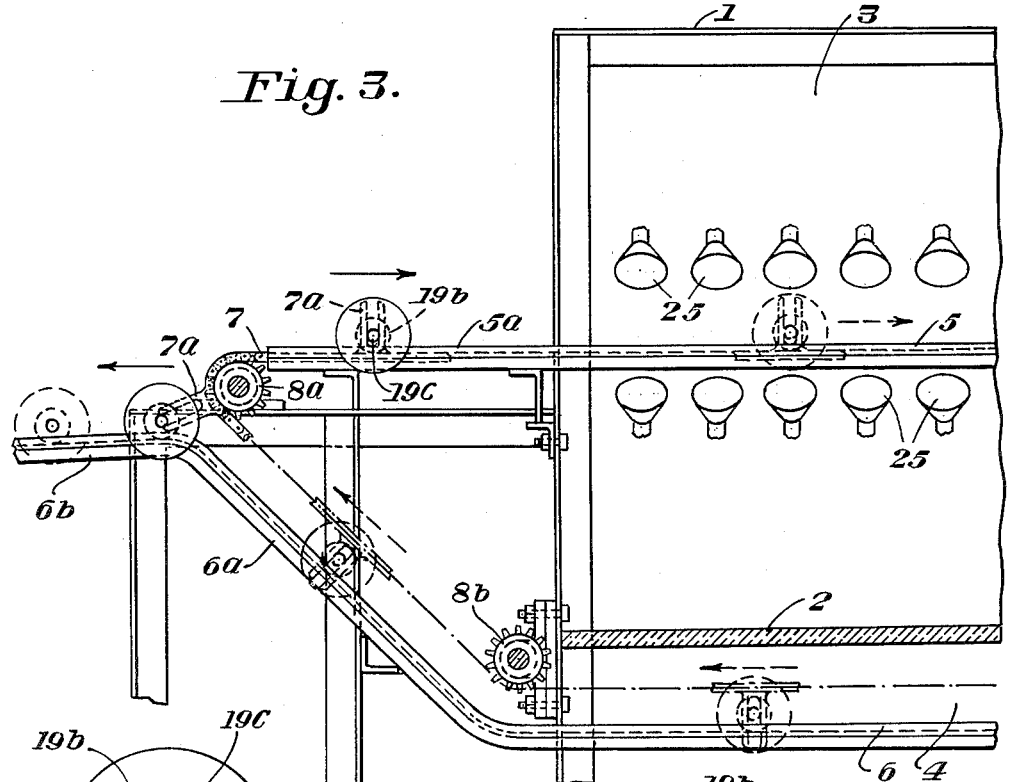
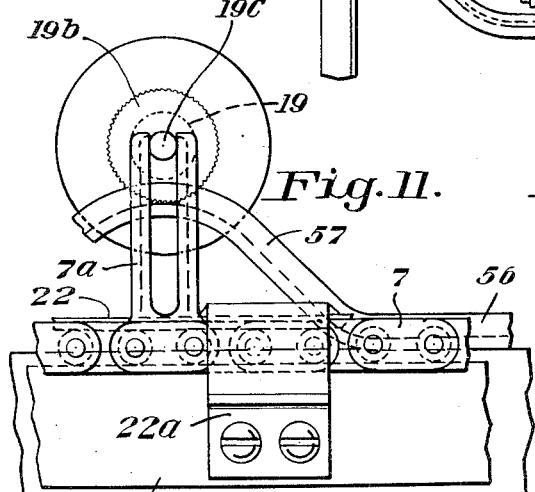
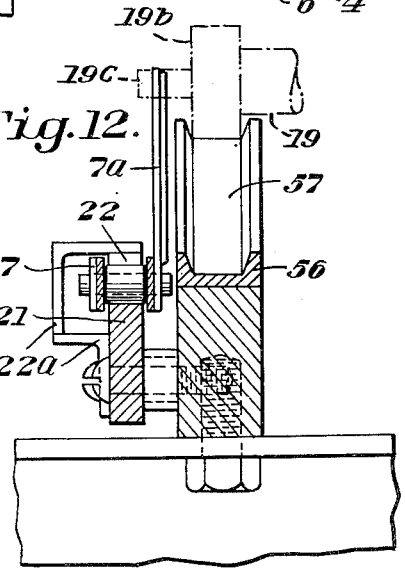
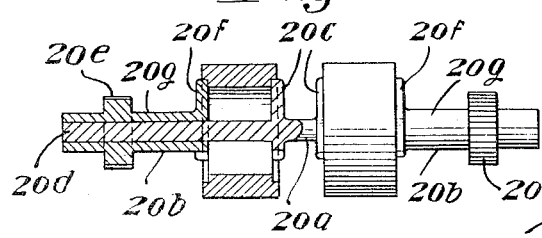
INVENTOR
Nathaniel B. Ornitz
by his attorneys
Stebbins, Blenko & Webb

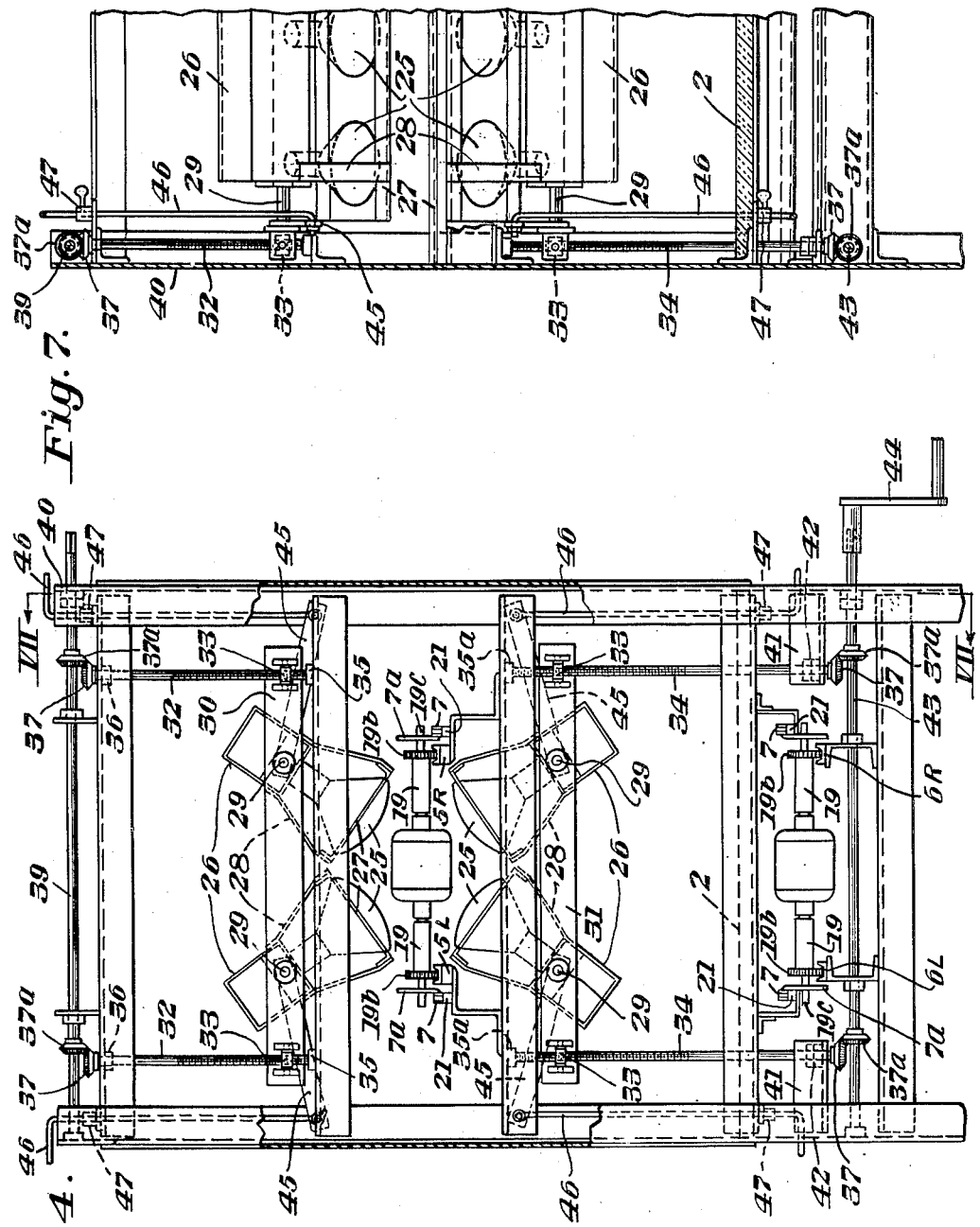

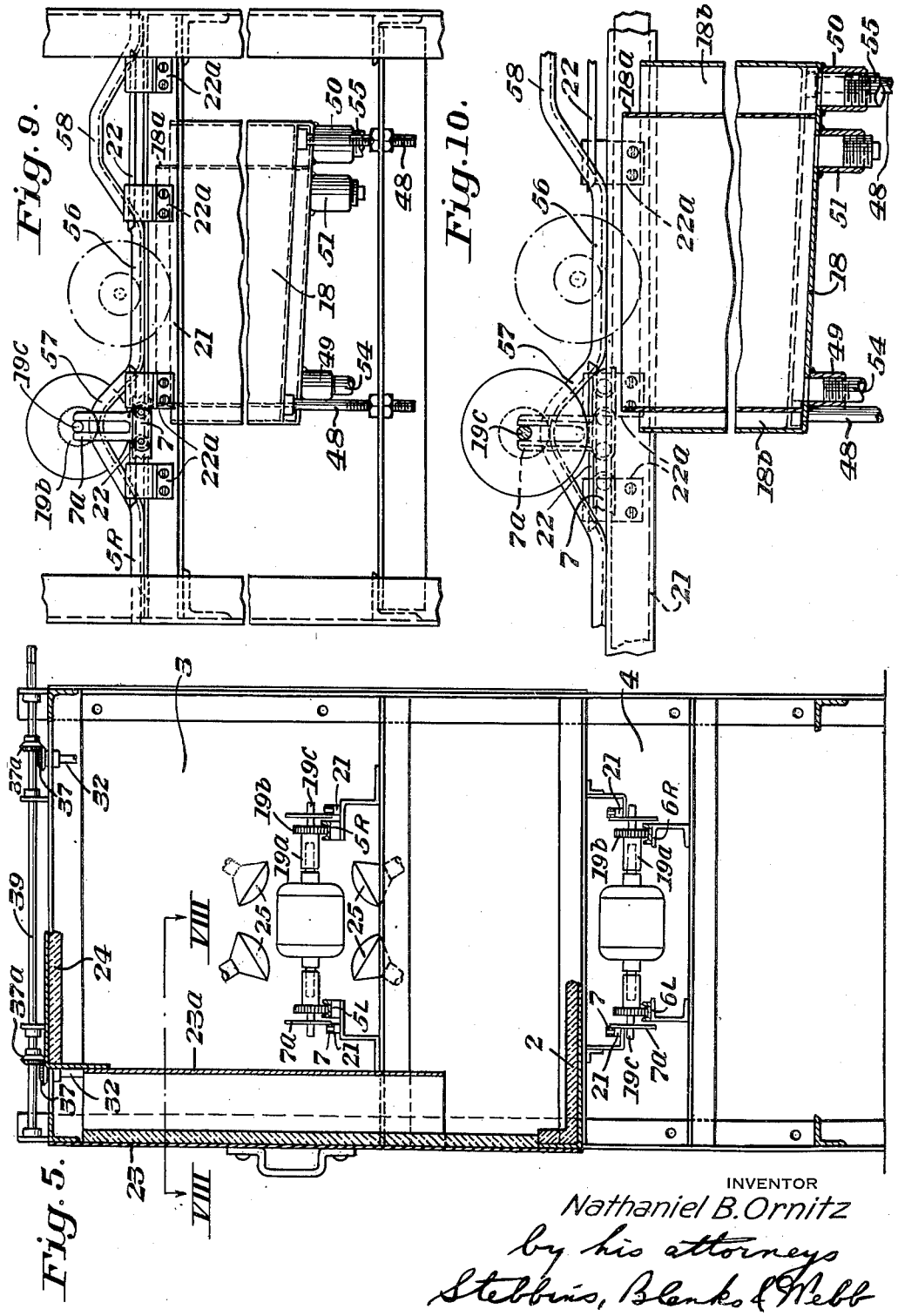

Patented Nov. 4, 1952

2,616,549

UNITED STATES PATENT OFFICE 2,616,549

APPARATUS FOR PROGRESSING ARTICLES OF MANUFACTURE

Nathaniel B. Ornitz, Pittsburgh, Pa., assignor to Blaw-Knox Company, Blaw-Knox, Pa., a corporation of New Jersey Original application June 5, 1946, Serial No. 674,462. Divided and this application May 5, 1948, Serial No. 25,291

5 Claims. (Cl. 198—19)

This application is a division of my copending application, Serial No. 674,462, filed June 5, 1946, and bearing the same title and now abandoned.

My apparatus is useful in the manufacture or treatment of articles of divers sorts. It provides suitable means for the continuous treatment of such articles in transit through a processing zone, or through several different processing zones in series, by which the articles are uniformly exposed to the action of the treating means. One of my objects is to provide apparatus for conveying articles in spaced relation through treating passages and to continuously rotate the articles conveyed so as to progressively expose different faces of the articles to the various treating means. The specific treatments of the articles may be of various kinds, including for example baking, curing, cooling, sterilizing, surface coating, impregnating and many other forms of physical or chemical treatment. In one particular embodiment my apparatus is especially adapted to effect thermal treatments and liquid dipping treatment; but my apparatus includes means for progressing and manipulating the articles for treatment, these means not being limited to the particular processing treatments mentioned and useful wherever it is important to effect correlation of time of passage, disposition of the treating means, rate of rotation of the articles and other features which are readily provided by my apparatus in an improved and novel manner.

My apparatus consists generally of a treating passage or several treating passages in series having a continuous track therethrough and having various treating means suitably disposed therein above, below, or above and below the path defined by the track. I provide also special rollers adapted to fit on opposite sides of one article, or a row of several articles, and when so assembled to roll along the track supporting the article or row of articles between the rollers. The manner of securing the rollers to the articles may include a frictional or interlocking fit causing the articles to turn with the rollers about their common axis. Extending throughout the passages generally parallel to the track I provide a continuously moving roller spacing means such as a chain having special links at spaced intervals, these special links including roller engaging means such as laterally extending forks which engage the rollers.

The serial arrangement of the passages need not be lineal; and in fact I prefer to dispose the passages in at least two tiers one above the other with separate tracks in each and transfer tracks from one passage to the other. In this case I provide my roller spacing means in the form of one or more elongated loops having reaches which extend along each track to move the articles in one direction through the upper passage and in the opposite direction through the lower passage. With this arrangement my apparatus provides a convenient loading and unloading station at one end of the passages.

At certain stations in the passages I also provide track sections having variations in grade or elevation whereby the articles are lowered and raised as the rollers progress through the passages on the tracks. This construction provides a manipulation of the articles downwardly or upwardly in addition to the rotary and horizontal manipulation whereby the articles may be automatically subjected to complex movements for special purposes. Such manipulation is particularly desirable where the articles are to be brought into physical contact with treating substances or apparatus, particularly where they are to be dipped into a treating liquid as in the embodiment subsequently to be described.

For illustration I shall describe in detail an embodiment of my apparatus which is useful for impregnating the windings of parts of electrical machinery such as armatures and stators or the like, whereby these parts are subjected to the treating steps of the process described in Alexander Patent No. 2,411,160 for "Varnishing Armature And The Like," issued November 19, 1946. This specific illustration described is one example of my apparatus which, however, may be used in different modifications for conducting many known processing treatments and is not limited to treatments specified in the Alexander patent referred to.

The example chosen for description is fully shown in the accompanying drawings in which Figures 1A and 1B are an elevation of a machine for impregnating the windings of armatures, stators and the like, it being understood that Figure 1B is a continuation of Figure 1A, with the two parts connected at the line $x$—$x$;

Figure 2A shows a typical assembly of an armature between two adaptor rollers ready for processing in the machine of Figures 1A and 1B;

Figure 2B shows a similiar typical assembly of two stators assembled on adaptor rollers; partially in elevation and partially in section;

Figure 3 is a partial elevation to larger scale of the loading and unloading end of the machine;

Figure 4, 5 and 6 are transverse sections through the apparatus at planes IV—IV, V—V and VI—VI, respectively, in Figures 1A and 1B;

Figure 7 is a partial vertical section at the plane VII—VII in Figure 4;

Figure 8 is a partial horizontal section taken at the plane VIII—VIII of Figure 5;

Figure 9 is an enlarged elevation of a portion of the apparatus and Figure 10 is a section taken longitudinally through the same portion;

Figure 11 is an enlarged view of a detail and Figure 12 is a section through the structure shown in Figure 11.

Figure 1A:
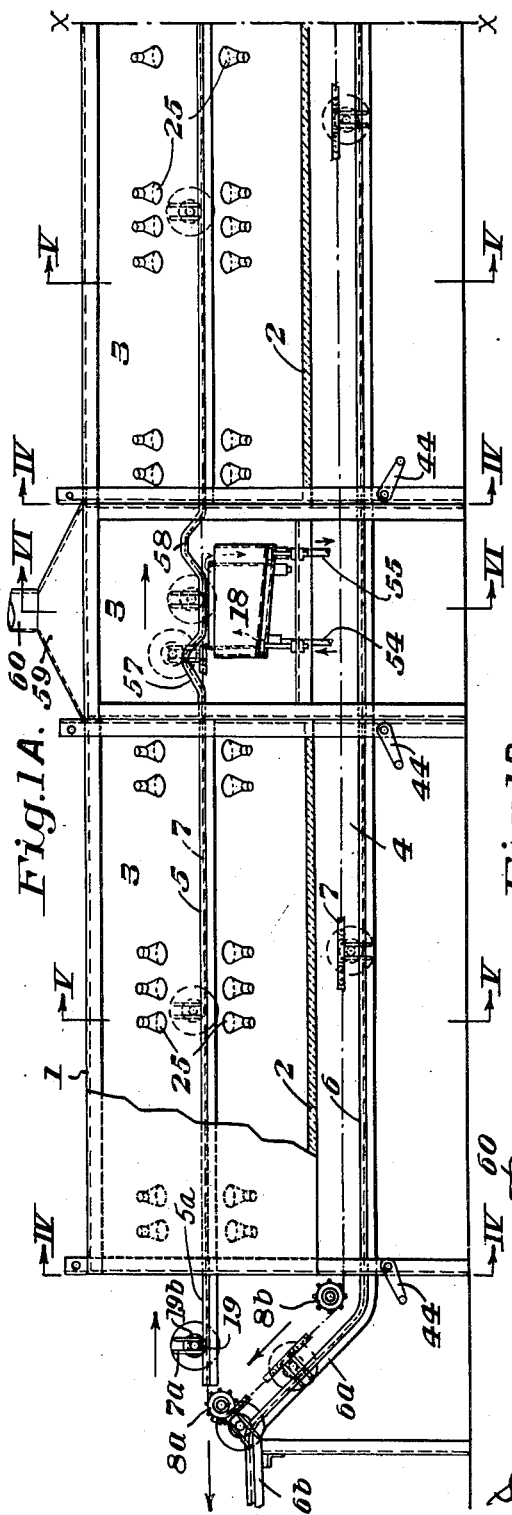
Figure 1B:
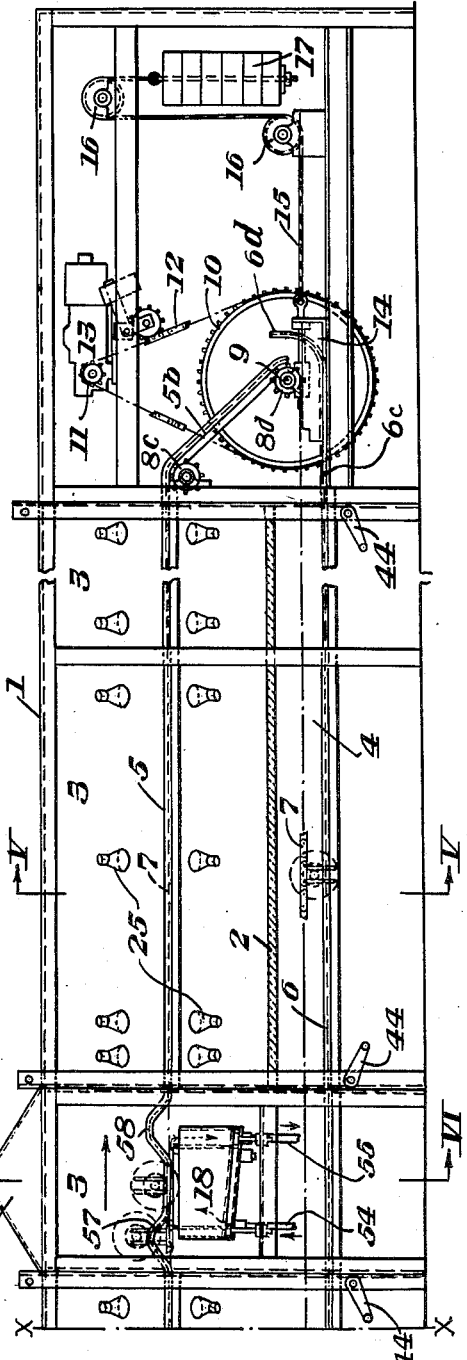

Referring now particularly to Figures 1A and 1B, the apparatus consists of a plurality of frame structures (designated collectively by 1) which are secured together in end-to-end relation. Most of these structures are divided by continuous horizontal partition 2 so as to define an upper generally horizontal treating passage 3 and a lower passage 4. The upper passage is also enclosed at the top and lateral sides by means of covering panels which will be subsequently more fully described. Only a portion of the side panels are shown in the Figures 1A and 1B, the remainder being broken away or omitted in order that the interior of the apparatus may be seen. The lower passage is not enclosed but is open to the atmosphere.

Through the upper passage 3 a track 5 extends and through the lower passage 4 a similar track 6 extends. These tracks project beyond the passages 3 and 4 at both ends. At the left-hand end of the apparatus as shown in Figures 1A and 3 the upper track extension 5a is a horizontal continuation of the track 5 while the extension of the lower track is comprised of an upwardly inclined section 6a and a short section 6b having a slight downward grade. In Figure 1B at the right-hand end thereof it will be seen that the upper track extension 5b is downwardly inclined whereas the lower track extension 6c is generally horizontal except that it includes at its extreme end an upwardly hooked portion 6d, which serves to receive articles transferred from the upper track.

Running generally parallel to the tracks 5 and 6 and the extensions thereof on each side are two elongated loops of roller chain 7 which extend around the sprockets 8a, 8b, 8c, and 8d. It will be observed that the sprockets are located generally at those stations where the tracks are deflected upwardly or downwardly and at which stations the chains must be deflected to move parallel to the tracks. Sprockets 8d are mounted on a shaft 9 which is driven at suitable speed through the sprockets 10 and 11 and chain 12 by the motor and gear reducer assembly 13. The chains are driven in the direction of the arrows; that is in Figures 1A and 1B the chains move from left to right in the upper passage 3 and from right to left in the lower passage 4.

I prefer to provide two chains 7 at the extreme opposite sides of the tracks 5 and 6 as is clearly shown in the sectional views of Figures 4, 5 and 6. It will be understood that there are also two sprockets each 8a, 8b, 8c and 8d at opposite sides of the apparatus. The shaft 9, of course, extends across the apparatus and both sprockets 8d as well as sprocket 10 are mounted thereon. To provide tension in the chain 7 I mount the shaft 9 in bearings on take-up blocks 14 on opposite sides of the end frame structure and connect the take-up blocks 14 by means of cables 15 and pulleys 16 to counterweights 17. Any conventional or convenient means for providing take-up and adjustment in length of the chains 7, may, of course, be used. As is shown in Figures 5 and 6 the tracks 5 and 6 are preferably comprised of paired spaced rails 5L, 5R and 6L, 6R which are supported by suitable structural members on the frame. This construction provides a substantially clear space above and below the path of the article to be treated by the rails and the different treating means which may be desired.

To support the article upon the rails I provide special adaptor rollers such, for example, as shown in Figures 2A and 2B. In Figure 2A the article to be treated is an armature having a shaft which extends through on both sides and the adaptor roller 19 which I prefer to use in such case consists of an integral hollow sleeve portion 19a, a knurled roller portion 19b and a trunnion portion 19c which are concentric about the axis of rotation. The sleeve portion 19a is bored to fit on the ends of the shaft of the armature to be processed. Two such rollers are assembled with each armature and when so assembled the opposite knurled roller portions 19b register with the gauge of the rails of the tracks 5 and 6. Thus when an armature is assembled between two of the adaptor rollers 19 and placed upon the end extension 5a of the upper track 5 it may be rolled through the passages 3 and 4 in sequence being returned eventually by way of the inclined track section 6a to the same end of the apparatus at which it was introduced. At intervals along the chain 7 I provided the links with forks 7a into which the roller extensions 19c are inserted when the armature assemblies are placed on the track extension 5a. The forks engaging the extensions 19c push the assembly in the direction of the chain travel along the track in the prescribed path. The knurled edge of the rollers (which is best seen in Figure 11), increases the frictional engagement of the circumference of the rollers with the track and insures that the assembly rotates in transit rather than slides over the track, especially on the inclined track portions where sliding is more likely to occur.

Figure 2B shows an adaptor roller assembly which I may provide for processing articles having a hollow core such as stators, by which two such articles may be mounted between each pair of rollers. The apparatus consists of three integral parts, namely a mandrel 20a and two adaptor rollers 20b which fit over the ends 20d of the mandrel. The two articles are each gripped between a plurality of radial arms 20c projecting from the mandrel near its center, and a plurality of similar radial arms 20f extending from the adaptor rollers, each of which also includes a roller portion 20e milled or serrated around its circumference and a sleeve portion 20g. Various other mandrel and roller arrangements may of course be substituted for mounting one or more articles between a pair of rollers, the example explained above being merely one of several suitable devices which I have used successfully.

As the chains 7 extend throughout reaches of substantial length, I prefer to support them continuously throughout each reach. For this purpose I provide beside each upper track rail 5L and 5R a continuous bar 21, and a similar bar 21 outside but above the track 6 in the lower passage. The bars 21 do not appear in Figures 1A and 1B but are clearly shown in Figures 4, 5, 6 and 12. As shown by Figure 12 particularly, the bars 21 are slightly narrower than the chains, the rollers of which engage its upper surface, and the side links overlap the bars slightly on each side.

At certain positions I prefer to provide a guide bar 22 (see Figures 9, 10, 11, and 12) on the side of the chain opposite to the supporting bar 21, defining between them a narrow passage in which the chain is restrained from twisting due to eccentricity of the applied forces. These positions are generally coincident with positions along the track where the rollers 19 or 20 engage the forks 7a near their extreme outer ends, which is incidental to the vertical manipulation of the articles previously mentioned and will be subsequently described in detail. The guide bars 22 are supported on the track structure by any convenient means, brackets 22a being shown for this purpose.

The upper passage 3 through the structure 1 contains opposed banks of infra-red radiators 25 in three spaced heating sections. Open-top dipping tanks 18 are located between the lamp-bank sections. The details of construction of these treating elements will be set forth subsequently, it being sufficient here to note that the radiators 25 are clustered in six banks, three above and three below the track level, and directed to converge their radiation upon the space between as shown in Figure 5, and that the dipping tanks 18 lie between the upper track rails 5L and 5R and generally below the track level as shown by Figure 6. As will also be further described in detail, the upper track 5 deviates in elevation adjacent opposite ends of the tanks 26 to cause the articles to be lowered into and withdrawn from the liquid contents of the tank in progress through these sections of the apparatus.

The lower or return passage 4 contains no special treating appliances and is open at the sides and bottom to permit the heated articles to cool in transit to the point of removal. My apparatus may be modified, if desired, to conduct other treating steps in the lower passage and to include means for accelerating the cooling more rapidly than is effected by mere exposure to the atmosphere.

The heating sections of my apparatus, three of which are shown in Figures 1A and 1B, are substantially identical except in length, which is varied as desired, and consist of a generally rectangular passage through which the track passes, insulated covering panels enclosing the passage, and means for mounting the infra-red radiating bulbs and adjusting them with respect to the articles to be heated. The general arrangement of the track, bulbs, and housing is shown in Figure 5, in which 2 is the insulated bottom, 23 are the side panels, and 24 the top panel closure. It will be observed from Figures 5 and 8 that the side panels 23 are provided with inwardly extending faces 23a, abutting at the top against downwardly turned flanges of top panel 24, but spaced from the insulated face at 23 providing a vent passage along each side of the heating sections which communicates with the interior below the level of the lower lamps.

As shown by Figures 4, 7, and 8, each radiator bank is comprised of a plurality of infra-red radiating bulbs 25 supported along a box-section sheet metal beam 26. A shield 27 having a plurality of holes through which the bulbs 25 extend, is supported on each beam 26 by spaced bars 28. Each beam 26 terminates at each end in a trunnion 29, which in turn is carried by and free to rotate in the two lateral supporting bars 30 and 31 provided at each end of the heating section. The bars 30 are bored to receive the trunnions of the two upper radiator banks, while the bars 31 similarly support the two lower radiator banks.

The bars 30 and 31 are adjustably secured in the frame 1 at each end of the heating sections thereof. For this purpose I provide two threaded rods or adjusting screws 32 held against longitudinal movement and passing through nuts 33 swivelled between brackets attached to the ends of upper bars 30, and similar vertical screws 34 passing through other swivelled nuts 33 mounted adjacent the ends of the lower bars 31. The lower ends of the screws 32 rest in sockets 35 provided on transverse members on the frame 1, while the upper ends of the screws 31 project through bearings 36 in a similar transverse member, and have secured to their upstanding ends bevel gears 37 whereby the screws 31 may be turned. A shaft 39 is journaled in bearings in upwardly projecting ends 40 of the posts of the supporting frame, and extends transversely across the apparatus, having mounted thereon companion bevel gears 37a which engage the gears 37. The shafts 40 extend beyond the frame 1 on one side where the shaft ends are squared to receive a crank handle for operation.

The upper ends of screws 34 engage sockets 35a in transverse frame members, while their lower ends are journaled in brackets 41, upon which the end thrust is carried by means of collars 42 fixed to the screw rods 34. The lower ends of the screws 34 have bevel gears 37 thereon which mesh with bevel gears 37a mounted on a lower shaft 43 generally similar to the shaft 39. In the drawings, a crank 44 is shown engaging the projecting squared end of shaft 43. The crank is applied only when the level of the lower lamps is being adjusted, but may be removed and applied similarly to the end of shaft 39 to adjust the elevation of the upper lamp banks.

The swivel mounting of the radiator banks in the bars 30 and 31 permits their rotation to adjust the radiation in the desired direction. To effect this I secure a lever 45 to each trunnion. A generally vertical adjusting rod 46 is pivoted to the end of each lever. I provide a thumbscrew type clamp 47 on the frame 1 to secure each rod 46 in fixed position after the adjustment is made. As shown in the drawings, the rods 46 pass through the housing and the clamps 47 are on the outside thereof, permitting this adjustment to be made without removing the covering panels.

It will be apparent from the foregoing that the heating sections of my machine provide a compact grouping of heating means readily adjustable with respect to the articles being treated, both vertically and in orientation. While it is described particularly for use with infra-red lamps, the general construction described may be used with other suitable heating means if desired.

The two dipping sections of the apparatus shown in Figures 1A and 1B are also substantially identical, the details of construction in each being shown in Figures 6, and 9 through 12. The dip tank 18 is supported in the frame on four threaded adjusting rods 48, whereby its elevation may be adjusted to predetermine the depth of immersion of the articles. The tank 18 has an inner dipping well 18a to which liquid is fed through inlet 49, and a circumferential overflow channel 18b from which the liquid is withdrawn through outlet 50. A drain 51 is provided in the bottom of the dipping well 26a but this is normally closed by means of a plug as shown. As illustrated diagrammatically by Figure 6, the treating liquid from a supply tank 52 is delivered by pump 53 through pipe 54 to inlet 49, filling the dipping well 18a and continuously overflowing into channel 18b, whence it returns by gravity through pipe 55 to the tank 52. A coil 52a may be provided in the tank 52 through which a fluid medium is circulated to regulate the temperature of the treating liquid.

In order to lower the articles into the liquid and to subsequently remove them, I provide inclined sections in the track near the extremities of the dipping tank, as best shown in Figures 9 through 12. Each of the rails 5R and 5L is provided with a generally horizontal portion 56 intermediate the end walls of the dipping well 18a, and inclined portions 57 and 58 upwardly diverging from portion 56. I prefer to have the rail portions 56 at substantially the same elevation as that of the track in adjacent treating sections, and to secure this continuity I make the inclined rails 57 and 58 as one side of humps in the rails 5L and 5R above the ends of the treating tanks 18. The forks 7a on the chains are of sufficient length to engage the rollers 19 or 20 at the high points of these humps, and the chain guide bars 22 are conveniently made of substantially the same length as the base of the humps. The length of the horizontal rail sections 56 is of the same order as the circumference of rollers 19b or 20e, so that the articles are turned substantially one revolution while being immersed in the liquid.

Each dipping section is completely enclosed although the side panels are not shown in the drawings, being removed to show the interior structure. The top closure of the dipping sections is in the form of a vented hood 59 having a flue or vent pipe 60 by which vapors are carried away.

The machine as described above may be used for impregnating the windings of parts of electrical machinery following the process of Alexander Patent No. 2,411,180 previously referred to, in which case its operation is as follows:

Preparatory to treatment, a number of adaptor rollers such as 20b are constructed to fit the particular articles to be treated, and a supply of these and of the articles themselves is provided convenient to the operator who is stationed at the left-hand end of the apparatus in Figure 1A, facing the end of the machine. The operator assembles the rollers on the articles and places them upon the upper track extensions 5a, inserting the projecting trunnions of the rollers in the forks 7a of the continuously moving chain as empty forks rise around the sprocket 8a. Meanwhile the heating lamps 25 have been turned on and pump 53 started to circulate varnish used for impregnating through the dip tanks 18. The articles are rolled slowly along the upper track, first being preheated to the desired extent in the first heating section, next being immersed to a pre-determined radial depth in the first dip tank 18, as they turn one revolution to dip the entire circumference, then being progressed through the second heating section to bake the varnish, then being dipped again in varnish in the second tank 18, and finally being baked in the last heating second to cure the impregnating varnish. The articles then descend the inclined track section 56 where they are transferred to the lower track 6, being received by the hooked track section 6d. As the articles roll along the lower track they are cooled by radiation and free circulation of atmospheric air. They then pass upwardly along the inclined track section 6a to the top thereof, where they roll free of the fork links 7a towards the operator down the gently sloped track extensions 6b. The operator removes the returned articles and disassembles the adaptor rollers therefrom.

While I have described but one example of a machine constructed in accordance with my invention, adapted particularly for carrying out one particular process, my invention may be utilized in many modifications and to carry out other processes within the limitation of the following claims.

I claim:

1. Apparatus for progressing articles in the manufacture thereof comprising a pair of spaced parallel track rails defining a path through a processing zone, adaptor rollers supported on said rails with an article supported between and turned by oppositely spaced pairs of said rollers, continuously movable roller-spacing means extending generally parallel to said rails, said means having lateral extensions connected thereto substantially forming a slot the longer dimension of said slot extending generally normal to the direction of travel of said means, said slot engaging said adaptor rollers on each side thereof to limit lengthwise movement of said rollers relative to said means and to allow movement of said rollers generally normal to said means, and means for driving said roller-spacing means, whereby the article is progressed through said processing zone and simultaneously rotated to expose all sides of the article uniformly to the processing treatment.

2. Apparatus for treating articles in the manufacture thereof symmetrically relative to an axis through said articles comprising in combination adaptor rollers formed to be assembled in pairs with each article on opposite ends of said axis, two adjacent and parallel processing passages disposed one above the other, a track for said rollers extending longitudinally through the upper passage and a similar track extending longitudinally through the lower passage, an inclined transfer track at one end of said passages providing transfer of said rollers from one track to the other, extensions of said two first mentioned tracks at the opposite end of said passages providing means for loading and unloading said articles, a continuous chain loop paralleling said tracks including the inclined transfer track having roller propelling attachments spaced therealong, said roller propelling attachments each defining an open-ended slot extending on each side of said rollers to limit lengthwise movement of said rollers relative to said chain and to allow movement of said rollers generally normal to said chain, and means for driving said chain loop in one direction, whereby said articles are assembled and loaded at one end of the apparatus, progressed, rotated and uniformly treated about said axis, and returned to the same end for unloading and disassembly.

3. Apparatus for treating articles in the manufacture thereof symmetrically relative to an axis through said articles, comprising a longitudinally extending treating passage and a generally parallel return passage therebelow, tracks through said passages, a pair of continuous chains each having a reach generally parallel to the track in said treating passage and the track in said return passage, and forming a loop providing at each end thereof a transfer from one track to the other, means for moving the chains in one direction, an extension of said tracks and chain loops beyond said passages at the entering end of said treating passage constituting an unloading and loading station for articles to be treated, adaptor rollers formed to fit said articles in pairs on opposite ends of said axis to support them and to roll on said tracks, said rollers having axially extending projections, and pairs of fingers defining open-ended slots extending laterally from said chains at spaced points therealong formed to engage said projections on each side thereof and to propel said adaptor rollers in the direction of chain travel, said projections being free to move laterally in said slots, whereby the articles to be treated are progressed from said loading and unloading station through said passages, being continuously turned about their axes for uniform treatment with respect thereto, and the finished articles are returned to the same station for unloading.

4. Apparatus for progressing articles of manufacture through a treating zone comprising roller means formed to be attached to said article on opposite sides thereof, a track, generally horizontal, defining a path along which said rollers roll, said track including inclined sections providing variation in track elevation at certain stations where the article is to be lowered or raised, a driving chain extending generally parallel to said track in a straight reach, a plurality of offset laterally extending forked roller engaging means spaced along said chain, said chain being closely spaced with respect to the path of the axis of said rollers throughout the greater extent of said track and more distantly spaced only at said certain stations where the track level varies, and spaced bar means at said stations engaging said chain from opposite sides and restraining it from lateral deflection under eccentric forces applied through said roller engaging means in progressing said rollers.

5. Apparatus for progressing articles comprising in combination, a track including hump portions along which said articles are adapted to be rolled in spaced relation, a sprocket chain generally parallel to said track and adapted to be moved to roll said articles along said track, said articles being provided with an axial portion extending toward said chain, a fork assembly having relatively straight sides rigidly connected to said chain and offset therefrom toward said axial portion, said sides of said fork assembly extending on both sides of said axial portion in a direction normal thereto and to the direction of movement of said chain, a continuous bar for said chain, and a guide bar on the opposite side of said chain from said continuous bar extending across the base of said hump portions of said track, whereby as said articles are displaced generally normal to said direction of movement of said chain by said hump portions of said track, said bars resist any tendency of said fork assembly to deflect.

NATHANIEL B. ORNITZ.

REFERENCES CITED

The following references are of record in the file of this patent:

UNITED STATES PATENTS

| Number | Name | Date |
| --- | --- | --- |
| 568,685 | Irrgang | Sept. 29, 1896 |
| 2,202,399 | Riesen | May 28, 1940 |
| 2,308,651 | Dreisel | Jan. 19, 1943 |
| 2,354,124 | James | July 18, 1944 |
| 2,354,628 | Whitesell | July 25, 1944 |
| 2,463,650 | Snyder et al. | Mar. 8, 1949 |